United States Patent [19]

Sakakibara et al.

[11] Patent Number: 4,684,999
[45] Date of Patent: Aug. 4, 1987

[54] IMAGE READER

[75] Inventors: Kenji Sakakibara, Ichinomiya; Tetsuo Harano, Inazawa; Yasuhito Bandai, Nagoya; Eiichi Ohta, Handa, all of Japan

[73] Assignee: Brother Kogyo Kabushiki Kaisha, Aichi, Japan

[21] Appl. No.: 768,107

[22] Filed: Aug. 21, 1985

[30] Foreign Application Priority Data

Aug. 24, 1984 [JP] Japan ................. 59-177182
Aug. 24, 1984 [JP] Japan ................. 59-177183
Aug. 30, 1984 [JP] Japan ................. 59-182425

[51] Int. Cl.⁴ ............ H04N 1/024; H04N 1/14; H04N 1/387
[52] U.S. Cl. ......................... 358/294; 358/256
[58] Field of Search ................ 358/256, 294, 280

[56] References Cited

U.S. PATENT DOCUMENTS 4,327,380 4/1982 Yamada ..................... 358/256

FOREIGN PATENT DOCUMENTS 5781774 11/1980 Japan .

OTHER PUBLICATIONS

IBM Technical Disclosure Bulletin, vol. 20, No. 4, Sep. 1977, P1299, A. J. Dattilo et al., "Scanning Typewriter".

Primary Examiner—Howard Britton
Attorney, Agent, or Firm—Parkhurst & Oliff

[57] ABSTRACT

An image reader for reading images on a surface of a medium, having a feeding device for feeding the medium, carriage movable in a direction perpendicular to the direction of feed of the medium, a driving device for moving the carriage, and a reading head mounted on the carriage for reading the images on the medium surface. The image reader comprises an area setter for setting a reading area on the medium surface within which the images are read by the reading head. The reading area is set while the reading head is moved relative to the medium by the feeding and driving devices. The image reader further comprises a controller for controlling the feeding and driving devices and the reading head, to cause the reading head to read the images within the set reading area while the reading area is scanned by the reading head.

13 Claims, 13 Drawing Figures

IMAGE READER

BACKGROUND OF THE INVENTION

1. Field of the Art

The present invention relates generally to an image reader for reading images on a surface of a medium, and more particularly an image reader which is capable of reading images within a specified area on the medium surface, by means of a feeding movement of the medium and a reciprocating movement of a reading head in a direction perpendicular to the feeding direction.

2. Related Art Statement

An apparatus for reading images on a sheet of paper or other recording medium is known. Such a known image reading apparatus is designed to read images in the entire area of the recording medium after the dimensions of the medium are specified.

3. Problem Solved by the Invention

However, it is not always necessary to read the entire portion of a recording medium. Sometimes, it is dseired to read only a figure or graph on a document, or to read a limited region of a text, e.g., a given paragraph of a page, for transmitting such information to an external device, combining materials from two or more documents, or for other purposes. In these cases, the user of the known image reader is forced to read the images in the entire area of the medium, and therefore waste time in reading the portions of the medium that are not necessary. Further, the reading the unnecessary portions of the medium results in useless occupation of valuable memory space of the image reader.

SUMMARY OF THE INVENTION

It is therefore a primary object of the present invention to provide an improved image reader which is capable of reading images in a specified area of a recording medium.

According to the invention, there is provided an image reader for reading images on a surface of a medium, comprising: (a) a feeding device for feeding the medium in one of opposite directions; (b) a carriage movable in a direction perpendicular to the direction of feed of the medium; (c) a driving device for moving the carriage; a reading head mounted on the carriage for reading the images on the surface of the medium; (d) area-setting means for setting a reading area on the surface of the medium within which the images are read by the reading head, the reading area being set while the reading head is moved relative to the medium by the feeding and driving devices; and (e) reading control means for controlling the feeding and driving devices and the reading head, to cause the reading head to read the images within the reading area while the reading area is scanned by the reading head.

The image reader of the invention constructed as described above is capable of reading images in a desired area of the medium, irrespective of the specific size of the medium. Thus, it is possible to transfer a selected portion of a text, or only a figure or graph in a document, to an external device, or prepare a document by combining selected portions of texts from plural documents. Accordingly, the image reader according to the invention is significantly improved in its applications.

According to one advantageous embodiment of the invention, the area-setting means comprises an operator-controlled device which is operable to set the reading area, memory means for storing area-data defining the reading area, and area-setting control means for storing the area-data into the memory means, according to the operation of the operator-controlled device. In one form of this embodiment, the area-data comprises point-data representing plural points defining the reading area, and the operator-controlled device comprises a plurality of positioning keys such as cursor keys for positioning the reading head of the image reader at one of the plural points defining the reading area, and further comprises a plurality of point-setting keys operable to activate the area-setting control means to store the point-data which represents one of the plural points.

In accordance with another advantageous embodiment of the invention, the area-setting means comprises: memory means for storing point-data representing plural points defining the reading area; a first operator-controlled device operable to set the reading area; a first area-setting control means for storing into the memory means the point-data representing each one of the plural points, when the reading head is positioned at each one of the plural points one after another by the first operator-controlled device; a second operator-controlled device operable after the point-data representing a specific one of the plural points has been determined; and a second area-setting control means for determining, upon operation of the second operator-controlled device, the point-data representing the other points of the plural points, according to a predetermined relative positional relation between the above-identified specified point and the other points, and storing the determined point-data into the memory means.

It is possible that the second operator-controlled device is operated after the point-data of the specific one point has been stored in the memory means by operating the first operator-controlled device. Further, the second operator-controlled device may be operated after the reading head (its reading portion or a marker attached to the reading head) has been positioned at the specific one point, but before the point-data of the specific one point has been stored in the memory means. In the former case, the operation of the second operator-controlled device will cause the second area-setting control means to obtain point-data of the points other than the specific one point and store the obtained point-data into the memory means. In the latter case, the point-data of the specific one point and the point-data of the other points are stored into the memory means when the second operator-controlled device is operated. The phrase "after the point-data representing a specific one of the plural points has been determined" used in the preeceding paragraph should be interpreted to mean the above-indicated two cases.

In one form of the above embodiment, the second operator-controlled device is operable to set another reading area on the surface of the medium after the point-data representing the plural points of the previous reading area has been stored in the memory means. In this case, the second area-setting control means determines, based on the point-data of the previous reading area already stored in the memory means, point-data representing points of said another of new reading area which correspond to the other points of the previous reading area whose point-data has been stored in the memory means.

According to the above form of the invention, two or more reading areas of the same size and shape may be easily set. Described in detail, the point-data of the first reading area must be obtained by operating the first operator-controlled device to move the reading head to each one of the individual plural points defining the first reading area. However, the point-data of the second and subsequent reading areas may be easily stored in the memory means. To set the second reading area, for example, the operator moves the reading head to one of the plural points defining the second reading area by operating the first operator-controlled device, and then simply operates the second-operator controlled device. The, the operator does not have to move the reading head to the other points of the second reading area. In this case, the second area-setting control means determines the point-data of these other points of the second reading area based on the point-data of the first reading area which has already been stored in the memory means. Consequently, the instant arrangement reduces the necessary time for setting the second and subsequent reading areas which are identical in size and shape to the first reading area.

According to an alternative form of the above embodiment, the second area-setting control means determines the point-data representing said other points of the reading area, according to standard data which represents a standard reading area having predetermined size and shape. In this case, the standard area data defines the predetermined relative positional relation between a specific point and the other points of the reading area. The reading area may be easily set by simply moving the reading head to one of the plural points and operating the second operator-controlled device. The point-data of the point is determined by the second area-setting control means, based on the standard area data.

According to a further advantageous embodiment of the invention, the carriage carries a cursor member having a marker which is disposed a predetermined distance away from a reading portion of the reading head along the surface of the medium. The area-setting means sets the reading area by positioning the marker relative to the medium, and the reading control means shifts the reading area, by the predetermined distance between the marker and the reading portion of the reading head, and causes the reading head to scan the shifted reading area. The cursor may be a planar transparent member of synthetic resin having cross hairs or a reticle as the marker.

In the above embodiment, the operator may easily set a reading area by positioning the marker of the cursor on the carriage relative to the medium. In other words, the operator does not have to position the reading portion of the reading head at the individual points which define the reading area. In addition, the deviation of the marker from the reading portion of the reading head is automatically compensated for by the area-setting means. Hence, it is not required for the operator to compensate for the deviation, i.e., to shift the reading head by the deviation distance before the reading area is scanned and read by the reading head.

According to a still further embodiment of the invention, the image reader further comprises an operator-controlled device operable to check for the reading area which has been set by the area-setting means, and area-checking control means for activating, upon operation of the operator-controlled device, the medium feeding and carriage driving devices to produce a relative movement between the reading head and the medium. This relative movement permits the operator to perceive the reading area. In a preferred form of this embodiment, the reading area is defined by a rectangle, and the movement of the reading head relative to the medium comprises a movement along two adjacent sides of the rectangle.

In the above embodiment, the operator may check to see if the reading area set by the area-setting means is correct and adequate or not, by operating the operator-controlled device and observing the resulting relative movement between the reading head and the medium. This provision for checking the reading area makes it possible to reduce the reading area to a permissible minimum necessary for reading the intended images, and thereby minimize the required reading time and memory area of the reader. Further, the checking function according to the instant embodiment prevents undersizing or oversizing the set reading area, which causes the reading head to fail to read the peripheral part of the intended reading region, or read unnecessary images around the periphery of the intended reading region.

BRIEF DESCRIPTION OF THE DRAWINGS

The above and other objects, features and advantages of the present invention will be better understood from reading the following detailed description of preferred embodiments, when considered in conjunction with the accompanying drawings, in which.

DETAILED DESCRIPTION OF THE PREFERRED EMBODIMENT

To further clarify the concept of the present invention, preferred embodiments of the invention will be described by reference to the accompanying drawings.

Figure 1:
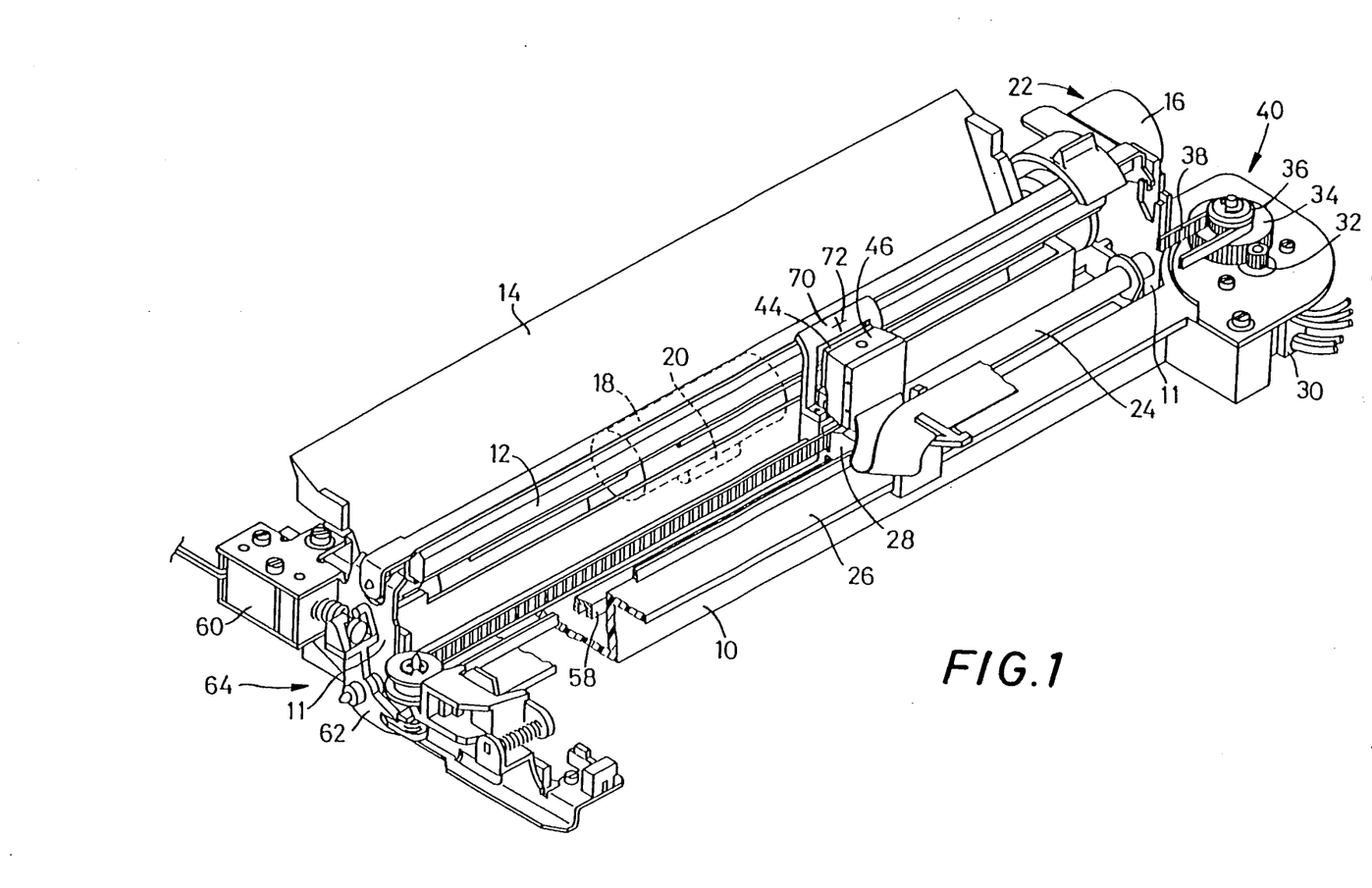
FIG. 1 is a perspective view of a mechanical part an image reader embodying the concept of the present invention.
Figure 2:
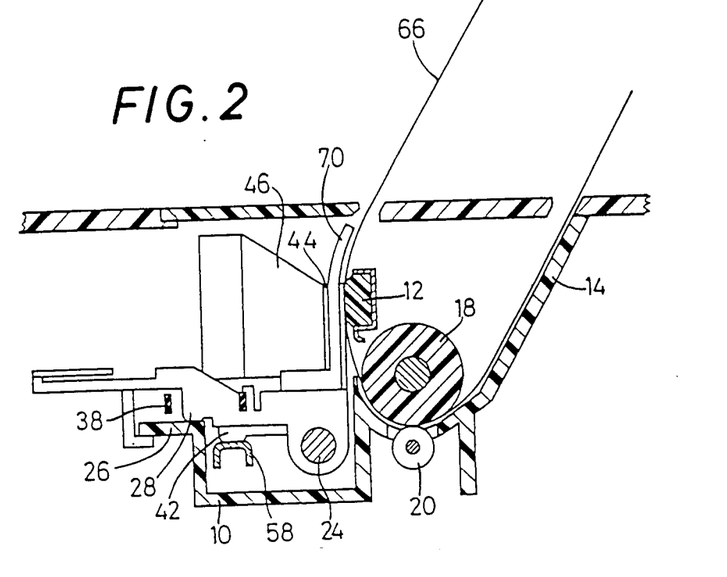
FIG. 2 is a fragmentary side elevational view in cross section of the image reader of FIG. 1.
Figure 3:
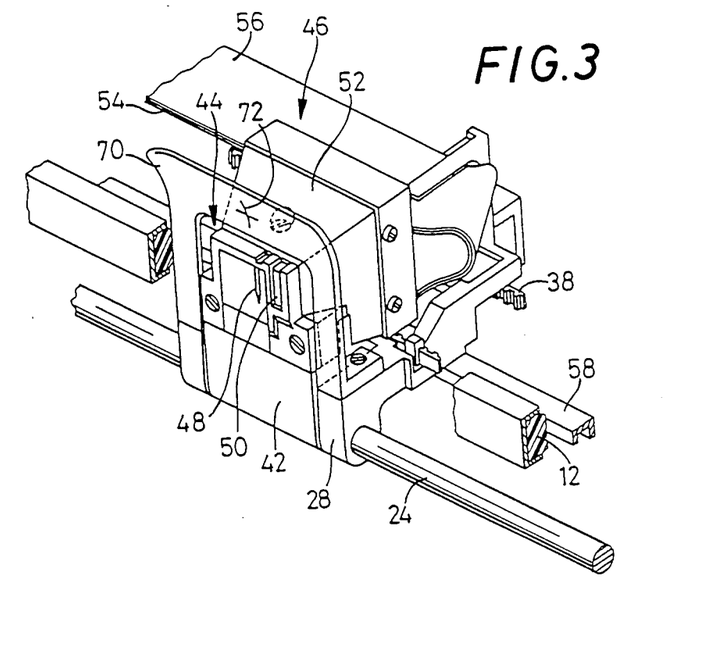
FIG. 3 is enlarged perspective view of a reading head and its vicinity of the image reader of FIG. 1.

Referring first to FIGS. 1-3, there is shown a mechanical part of an image reader embodying the invention, wherein reference numeral 10 designates a frame which includes right and left side walls 11. Between these side walls 11, there is disposed an elongated platen 12. Behind the platen 12, a paper guide 14 is provided as an integral part of the frame 10. A recording medium in the form of a sheet of paper 66 is guided by the paper guide 14 to a nip of feed rollers 18, 20 as shown in FIG. 2. The paper 66 gripped between the feed rolls 18, 20 is fed past the platen 12, in a direction perpendicular to the length of the platen 12, by means of a paper feeding device 22 which includes a paper feed motor 16 and the feed rolls 18, 20.

A guide rod 24 and a guide rail 26 are disposed so as to extend in parallel with the platen 12. The guide rail 26 is formed as an inegral part of the frame 10, and spaced from the guide rod 24 in a direction perpendicular to their length. A first carriage 28 is slidably supported on the guide rod 24 and rail 26. More specifically, the first carriage 28 is reciprocated along the length of the platen 12 by a carriage driving device 40 which comprises a carriage drive motor 30, a pinion 32, a gear 34, a timing pulley 36 and a timing belt 38.

Figure 4:
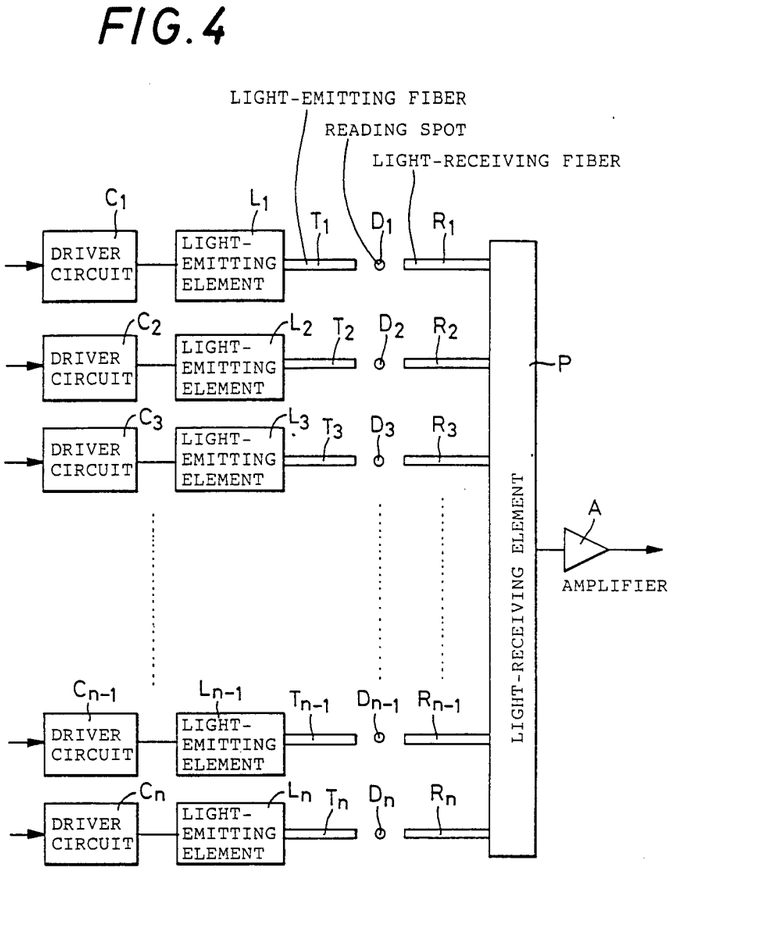
FIG. 4 is an illustrative view showing an arrangement of the reading head.

As most clearly shown in FIG. 3, the first carriage 28 has a cutout opposite the platen 12, so that a second carriage 42 is received in the cutout. The second carriage 42 carries a thermal print head 44 and a reading head 46. The thermal print head 44 has a printing portion 48 which is equipped with a vertical row of heat generating elements arranged in the direction of feed of the paper 66. The reading head 46 has a reading portion 50 formed in the feeding direction of the paper 66. The reading portion 50 is constituted by end portions of light-emitting fibers T1-Tn and light-receiving fibers R1-Rn (16 pairs of light-emitting and light-receiving fibers are provided, in this specific embodiment). The end portions of the fibers T1-Tn and R1-Rn are positioned in a first and a second row, respectively, which rows are disposed in parallel with each other in the vertical direction. The ends of these fibers are inwardly spaced from the surface of the thermal head 44, by a distance of 0.15 mm, for example. As illustrated in FIG. 4, the reading-side ends of the light-emitting and light-receiving fibers T1-Tn, R1-Rn are disposed opposite reading spots D1-Dn on the sheet of paper 66. The other ends of the light-emitting fibers T1-Tn are positioned so as to be opposite corresponding light-emitting elements L1-Ln, while the other ends of the light-receiving fibers R1-Rn are disposed so as to be opposite a light-sensitive element P. The light-emitting elements L1-Ln, driver circuits C1-Cn which activate these elements L1-Ln, the light-sensitive element P, and an amplifier A which amplifies the output of the element P, are all incorporated in a casing indicated at 52 in FIG. 3 of the reading head 46. A first flexible cable 54 in the form of a belt is connected to the reading head 46 to receive input signals from the driver circuits C1-Cn, and provide an output from the light-sensitive element P. A second flexible cable 56 is provided in superposed relation with the first flexible cable 54, to apply signals to the previously indicated heat generating elements of the thermal print head 44.

The second carriage 42 which is movable along the guide rod 24 together with the first carriage 28, is adapted to pivot about the guide rod 24. The second carriage 42 is biased by a spring (not shown) so that it is pivoted in a direction that causes the thermal print head 44 and the reading head 46 to be moved away from the platen 12. Stated another way, the second carriage 42 is normally held by the biasing spring in a position shown in FIG. 2, in which a portion of the second carriage 42 remote from the guide rod 24 is held in pressed contact with a top surface of a bar 58. This bar 58 is adapted to be moved upward by an oscillating device 64 which includes a solenoid 60 and a bell crank 62 shown in FIG. 1. With the bar 58 moved upward, the second carriage 42 is pivoted to move the thermal print head 44 and the reading head 46 toward the platen 12, whereby these heads 44, 46 are forced against the surface of the paper 66.

As most clearly shown in FIG. 3, a cursor member 70 is attached to the first carriage 28. The cursor member 70 is a generally planar transparent member made of a synthetic resin which has an aperture accommodating the end portions of the thermal print head 44 and reading head 46. The cursor member 70 is curved at its upper part along a path of the paper 66, and the curved upper part has a marker 72 in the form of cross hairs of a reticle. The marker 72 is spaced a suitable distance from the reading portion 50 of the reading head 46 in a direction parallel to the path of the paper 66, so that the operator may easily observe the marker 72.

Figure 5:
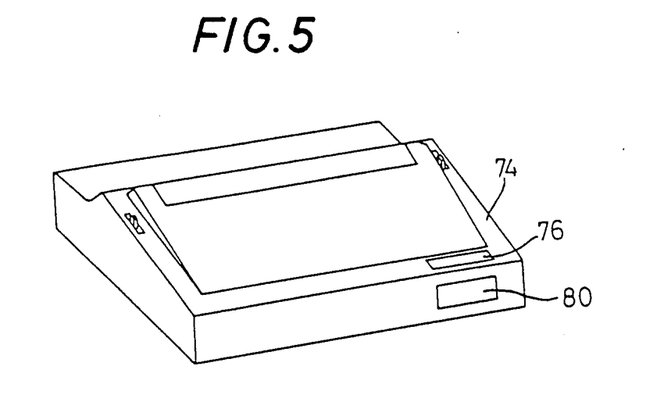
FIG. 5 is a perspective outer view of the image reader.
Figure 6:
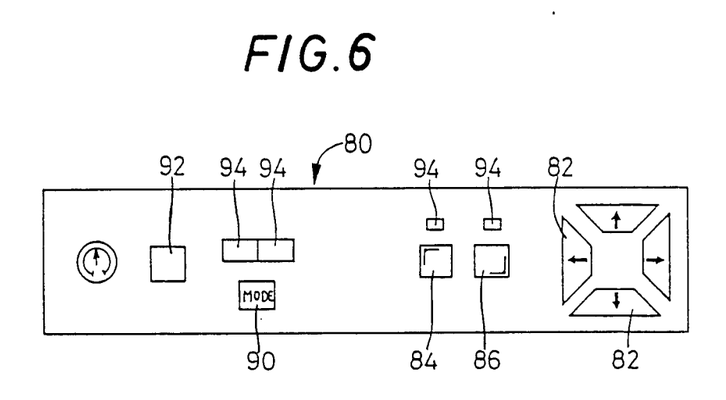
FIG. 6 is a view showing an operator control panel of the image reader.

The printing and reading arrangements which have been described hitherto are accommodated in a casing 74 illustrated in FIG. 5. The casing 74 is provided with a printing control panel 76 and a reading control panel 80. As illustrated in FIG. 6, the reading control panel 80 has: positioning keys in the form of four cursor keys 82; point-setting keys in the form of an upper-left corner setting key 84 and a lower-right corner setting key 86; a mode selector key 90, a start key 92, and light-emitting diodes 94. The cursor keys 82 are used to move the reading head 46 relative to the paper 66 in the respective four directions, i.e., in the right and left, and upward and downward directions. The upper-left corner and lower-right corner setting keys 84, 86 are used to set an upper left corner point and a lower right corner point of a reading area, which will be described in detail below. The cursor keys 82, and the corner setting keys 84, 86 constitute a first operator-controlled device. The corner setting keys 84, 86 also serve as a second operator-controlled device when they are operated simultaneously. The mode selector key 90 is operated to select one of two reading modes which provides two different incremental distances of the reading head 46 during an image reading operation. The start key 92 is used to start an image reading operation.

Figure 7:
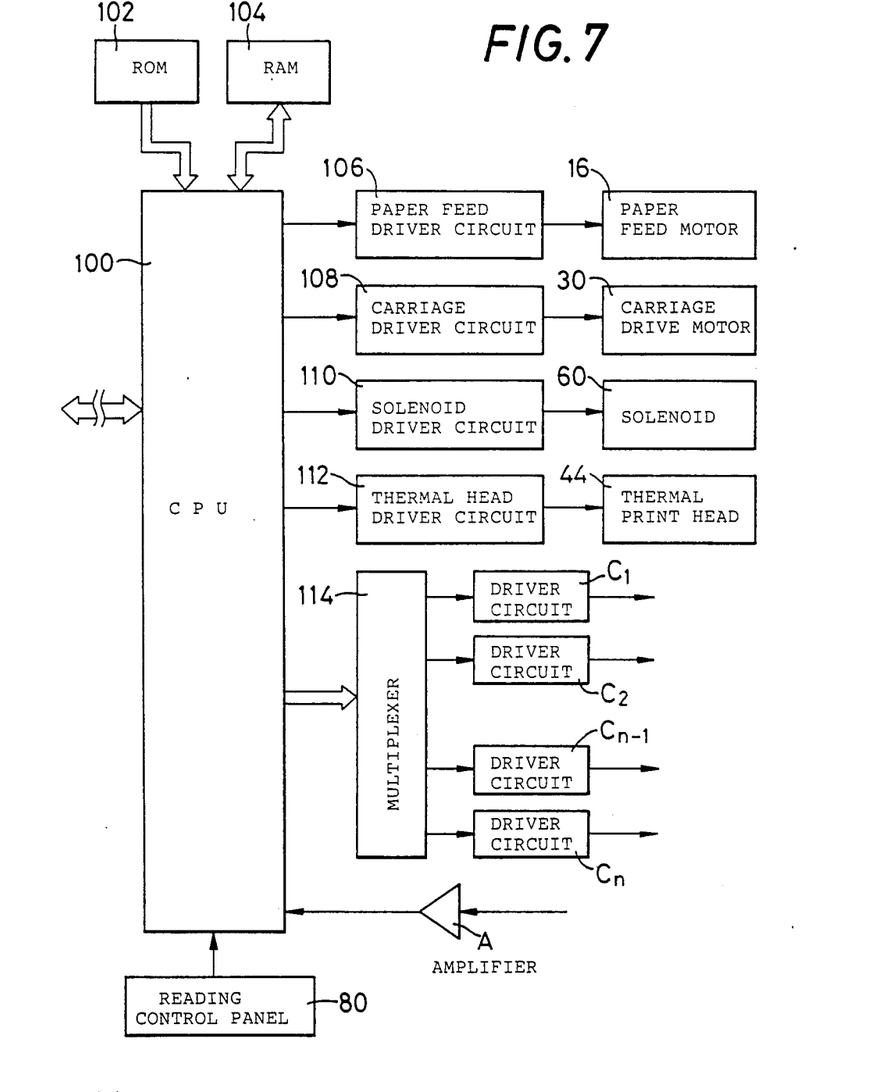
FIG. 7 is a schematic block diagram illustrating a control system of the image reader.

FIG. 7 shows a control system of the instant image printer, using a microcomputer which comprises a central processing unit 100 (hereinafter referred to as "CPU 100"), a read-only memory 102 (hereinafter called "ROM 102"), and a random-access memory 104 (hereinafter called "RAM 104"). The microcomputer constitutes a major part of the control circuit. The CPU 100 is adapted to control the paper feed motor 16, the carriage drive motor 30, the solenoid 60 and the thermal print head 44, through a paper feed driver circuit 106, a carriage driver circuit 108, a solenoid driver circuit 110 and a thermal head driver circuit 112 respectively. The CPU 100 applies through a multiplexer 114 signals to the driver circuits C1-Cn to activate the corresponding light-emitting elements L1-Ln to emit beams of light. The emitted light beams are transmitted through the corresponding light-emitting fibers T1-Tn toward the reading spots D1-Dn on the surface of the paper 66. The light beams reflected by the reading spots D1-Dn are received by the light-sensitive element P through the light-receiving fibers R1-Rn, and the signals from the light-sensitive element P are fed to the CPU 100 through the amplifier A. The CPU 100 is connected through an interface (not shown) to an external word or text processor, computer or other instruments, for interactive communication.

The RAM 104 serves as memory means for storing position data representing points which are to be read by the reading head 46, and data representing the results of reading by the reading head 46. The ROM 102 stores a control program indicated by the flow charts of FIGS. 8a and 8b, and various other control programs. The microcomputer comprising the CPU 100, ROM 102 and RAM 104 constitutes area-setting means and reading control means, which will be described in greater detail below.

Figure 8A:
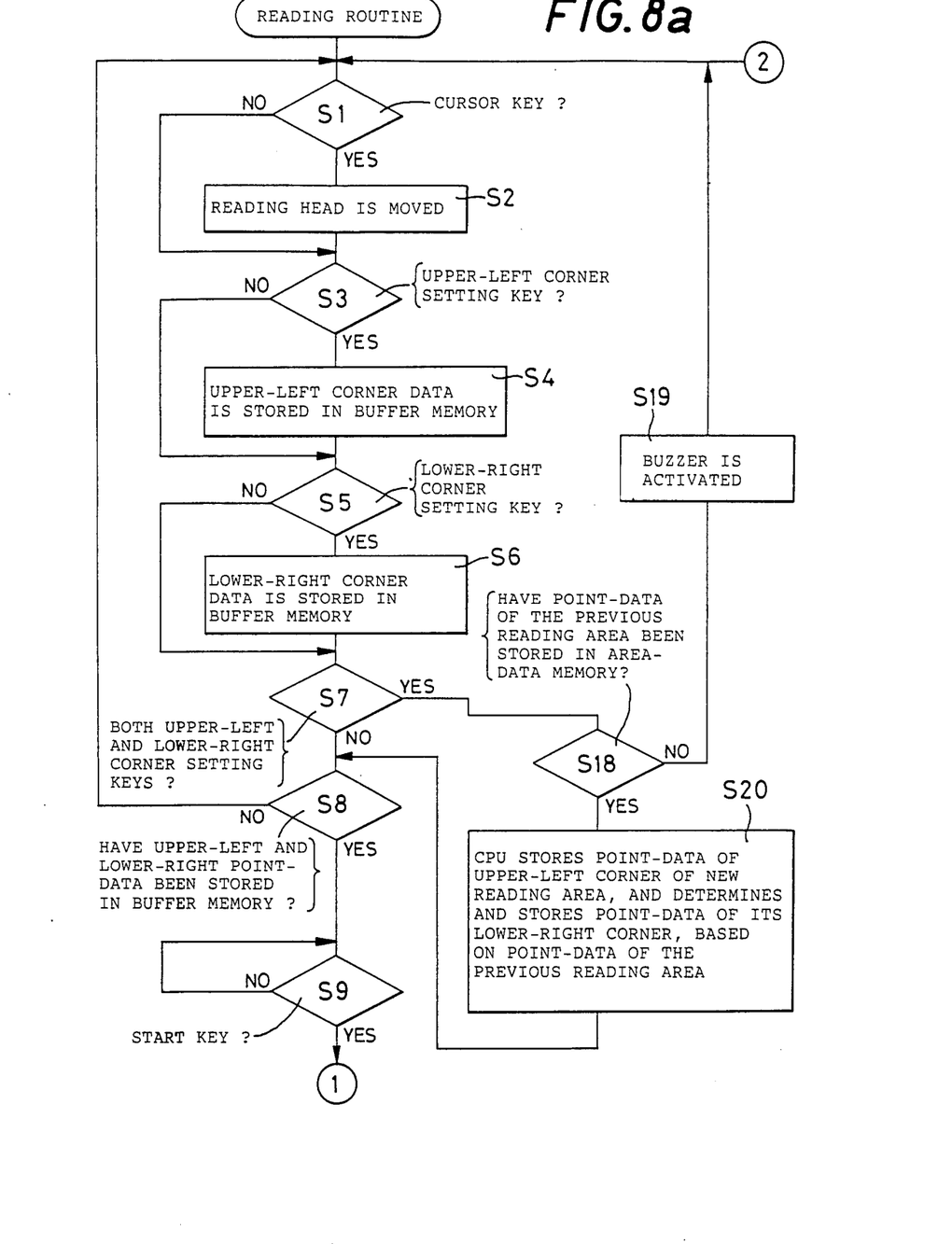
FIGS. 8a and 8b are flow charts showing a portion of a control program associated with the subject matter of the invention, which program is stored in a read-only memory shown in FIG. 7.
Figure 9:
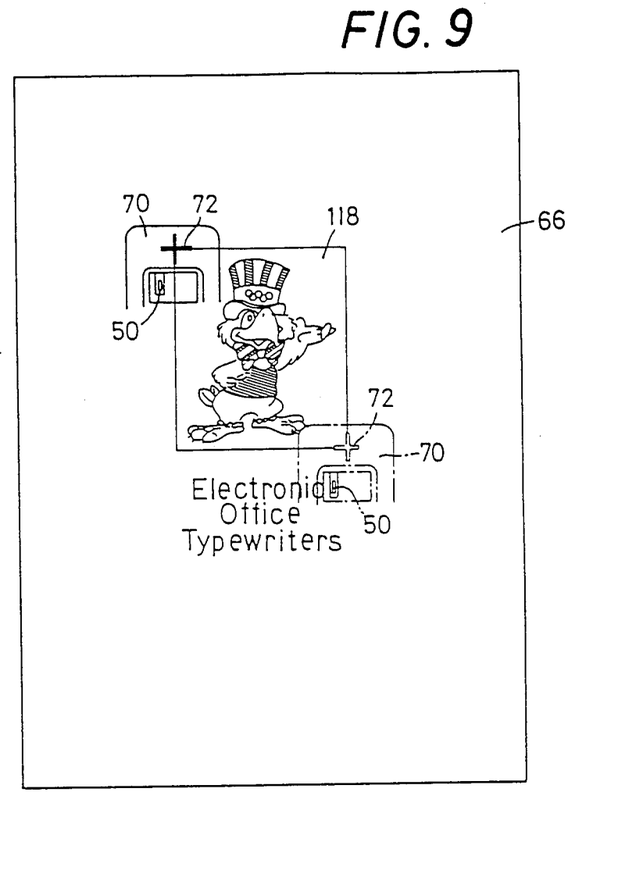
FIGS. 9 and 10 are illustrations showing a manner in which a reading area of the reading head is set according to the invention.

Referring to FIG. 9, there is shown a desired rectangular reading area 118 on the paper 66 which contains images to be read by the reading head 46. To read the images within the desired reading area 118, the operator of the image reader operates the paper feeding device 22 and the carriage driving device 40 through the appropriate cursor keys 82, in order to bring the marker 72 of the cursor member 70 of the head 46 into alignment with the upper-left corner of the rectangle of the reading area 118. With the marker 72 (intersection of its cross hairs) aligned with the upper-left corner of the reading area 118, the operator activates the upper-left corner setting key 84. In response to the above operations by the operator, the CPU 100 executes steps S1–S4' shown in FIG. 8a. In step S4, the CPU 100 stores into a buffer memory of the RAM 104 point-data which represents the position of the upper-left corner of the reading area 118, more precisely, X and Y coordinate positions of the upper-left corner. Similarly, the CPU 100 executes steps S1–S3, S5 and S6, when the operator moves the marker 72 into alignment with the lower-right corner of the reading area 118 and activates the lower-right corner setting key 86. As a result, the X and Y coordinate position data of the lower-right corner of the reading area 118 are stored in the buffer memory of the RAM 104. The above decision steps S1, S3 and S5, as well as steps S7 and S8, are repeated until an affirmative judgment ("YES") is obtained in step S8, namely, until the point-data of the upper-left and lower-right corners of the reading area 118 have been stored in the RAM 104. Alternatively the position of the lower-right corner may be set prior to the position of the upper-left corner.

After the CPU 100 has stored in the buffer memory of the RAM 104 the point-data of the upper-left and lower-right corners of the rectangular reading area 118, the CPU 100 repeats step S9, i.e., waits for the activation of the start key 92 for starting a reading operation by the reading head 46.

Upon depression of the start key 92 by the operator in step S9, the CPU 100 goes to step S10 (FIG. 8b) to check if the point-data of the upper-left and lower-right corner positions of the reading area 118 have been stored in the buffer memory of the RAM 104. If not, the CPU 100 judges that the start key 92 was erroneously operated, and goes to step S11 for activating a buzzer to inform the operator that the necessary point-data has not been stored in the buffer memory. Then, the CPU 100 goes back to step S1. When the judgment in step S10 is affirmative, step S10 is followed by step S12 wherein the CPU 100 transfers the point-data from the buffer memory to an area-data memory of the RAM 104.

Figure 8B:
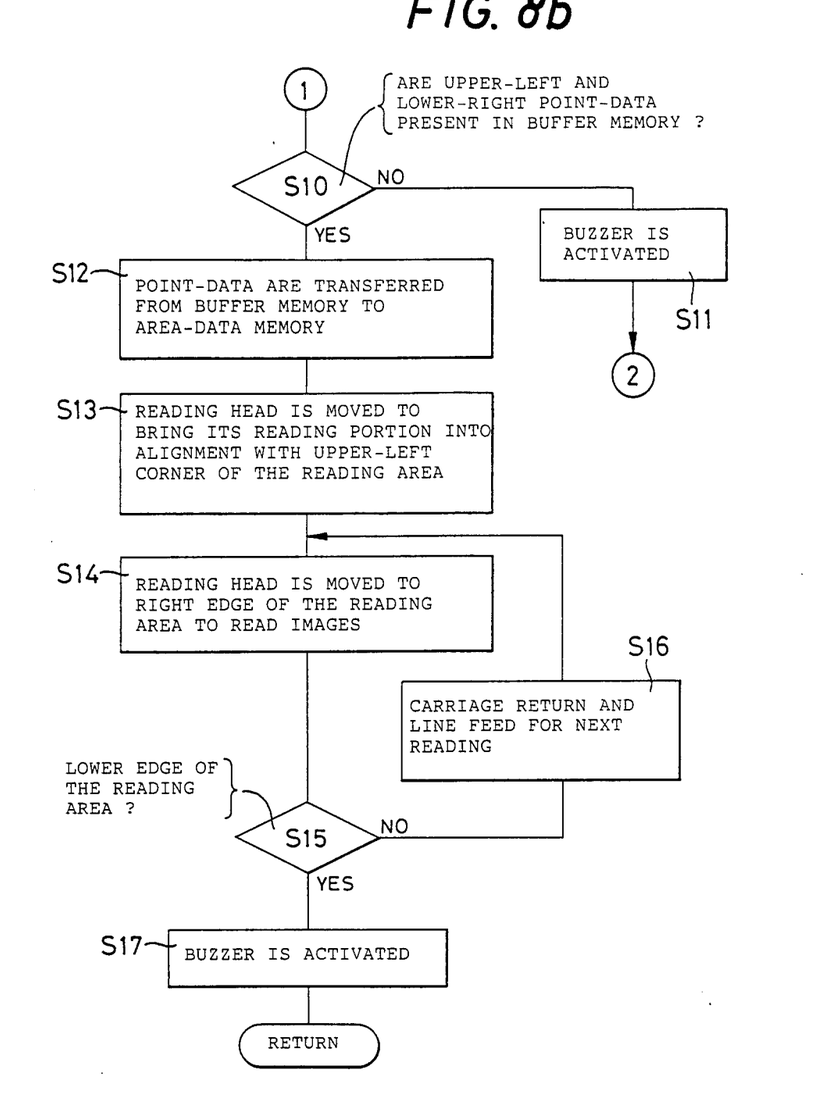

Subsequently, step S13 is executed to bring the reading portion 50 of the reading head 46 into alignment with the upper-left corner point of the reading area 118.

Stated more specifically, the point-data of the upper-left and lower-right corner positions stored in the area-data memory are modified to compensate for the distance of deviation of the reading portion 50 from the marker 72 of the cursor member 70 (FIG. 9), which deviation distance is stored in the ROM 102. Based on the stored deviation distance data, the reading head 46 is moved for positioning its reading portion 50 at the upper-left corner of the reading area 118. In this condition, the upper end of the reading portion 50 is aligned with the intersection of the cross hairs of the marker 72 of the cursor member 70.

The above-described automatic modification of the point-data for compensating for the deviation distance of the reading head 50 from the marker 72, will permit the operator to easily and accurately set the corner points of the reading area 118 by simply positioning the easy-to-watch marker 72 at the corner points of the desired reading area. The operator is not required to perform any operation to compensate for the deviation of the reading portion 50 from the marker 72.

Step S13 is followed by step S14 in which the first line of the reading area 118 is scanned by the reading portion 50 while the reading head 46 is moved from the left edge to the right edge of the reading area 118. Described in more detail, the driver circuits C1–Cn activate the light-emitting elements L1–Ln each time the reading portion 50 is moved by one-pitch distance upon an incremental feed of the second carriage 42. As a result, the light-sensitive element P generates electric signals which represent amounts of light beams which have been reflected by the individual reading spots D1–Dn. These electric signals are amplified by the amplifier A, and received by the CPU 100 for storing the corresponding image data at the corresponding addresses of the RAM 104.

With the reading head 46 moved to the right edge of the reading area 118, the CPU 100 checks in step S15 to see if the lowermost line of the reading area 118 has been read. If not, step S15 is followed by step S16 in which the second carriage 42 is returned to the left edge of the area 118, while at the same time the paper 66 is fed in the forward direction by a distance equal to the length of the reading portion 50. Then, the CPU 100 executes the steps S14 and S15 to perform the next image reading cycle. This image reading cycle is repeated until the entire area of the reading area 118 has been scanned, that is, until the lowermost line has been read. Upon completion of the reading operation, step S15 is followed by step S17 to activate the buzzer several times to inform the operator that the images within the specified reading area 118 have been read.

As described above, an ordinary image reading operation is performed. When it is desired to read an image within a reading area which is different in size and/or configuration, the reading area is set with the same procedure as previously described. However, if it is desired to read an image in another reading area which is identical in size and configuration with, but different in position from the reading area 118 whose area-data has been stored in the RAM 104, the following simplified procedure may be used.

Figure 10:
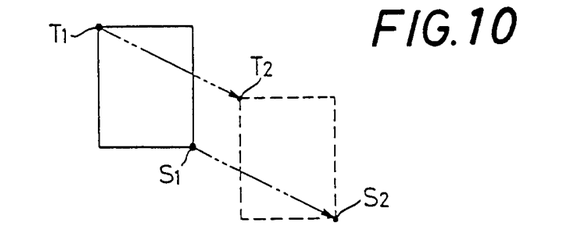

After the reading of the images within the first reading area 118 has been completed, the operator moves the reading head 46 to align the marker 72 with an upper-left corner of a new reading area at a different location on the same paper 66 or another medium. With the marker 72 positioned at the upper-left corner of the reading area, the operator activates simultaneously both the upper-left corner setting key 84 and the lower-right corner setting key 86. As a result, the result of the judgment in step S7 becomes affirmative (YES), and the CPU 100 goes to step S18 to check if the point-data of the previous reading area 118 has been stored in the area-data memory of the RAM 104. If not, the CPU 100 goes to step S19 wherein the buzzer is turned on to inform the operator that the setting keys 84, and 86 were erroneously operated. Subsequently, the CPU 100 returns to step S1. Since, in this example, the point-data of the previous reading area 118 has been stored in the area-data memory, the judgment in step S18 is affirmative, whereby step S18 is followed by step S20. In step S20, the CPU 100 stores in the buffer memory point-data of the upper-left corner of the new area, and determines point-data of the lower-right corner point of the new reading area, based on the point-data of the previous reading area 118 stored in the RAM 104. Described more particularly referring to FIG. 10, the rectangle indicated by solid lines shows the previous reading area 118 of FIG. 9, while the rectangle indicated by broken lines shows the new reading area in question. Since the size and shape of the new area are the same as the previous area 118, a point S2 of the lower-right corner of the new area may be obtained by shifting the coresponding point S1 of the pevious area 118. The direction and distance of shift of the point S2 from the point S1 are determined by the stored point-data of the upper-left corner point T1 of the previous area 118 and the point-data of a point T2 of the upper-left corner of the new area. The point-data of the lower-right corner point S2 of the new area may be obtained by modifying the point-data of the corresponding point S1 of the previous area 118, in the determined direction and by the determined distance. The thus obtained point-data of the point S2 of the new area is stored in the buffer memory of the RAM 104. Thus, the point-data of the point T2 as well as the point S2 is stored in the buffer memory by operating the setting keys 84 and 86 simultaneously. In this manner, the setting of the new reading area has been completed (step S8), and the CPU 100 waits for the activation of the start key 92 in step S9. The operation to read the images in this newly set reading area is performed in the same manner as previously described.

The data representing the images read by the reading head 46 is stored in the RAM 104. The images may be reproduced on a suitable recording medium by the thermal print head 44 while the heat generating elements are energized by the thermal head driver circuit 112 according to the image data stored in the RAM 104. In the reproduction of the images, the paper feeding device 22, the carriage driving device 40, the oscillating device 64, etc. are operated in the same manner as in the image reading operation. It is possible that the image data stored in the RAM 104 is transmitted to an external device through the CPU 100 and an interface (not shown).

Figure 11:
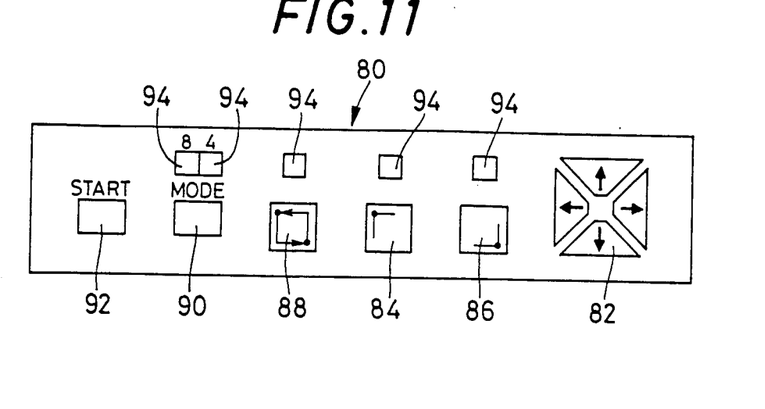
FIG. 11 is a view corresponding to FIG. 6, showing an operator control panel of a modified embodiment of the invention.
Figure 12:
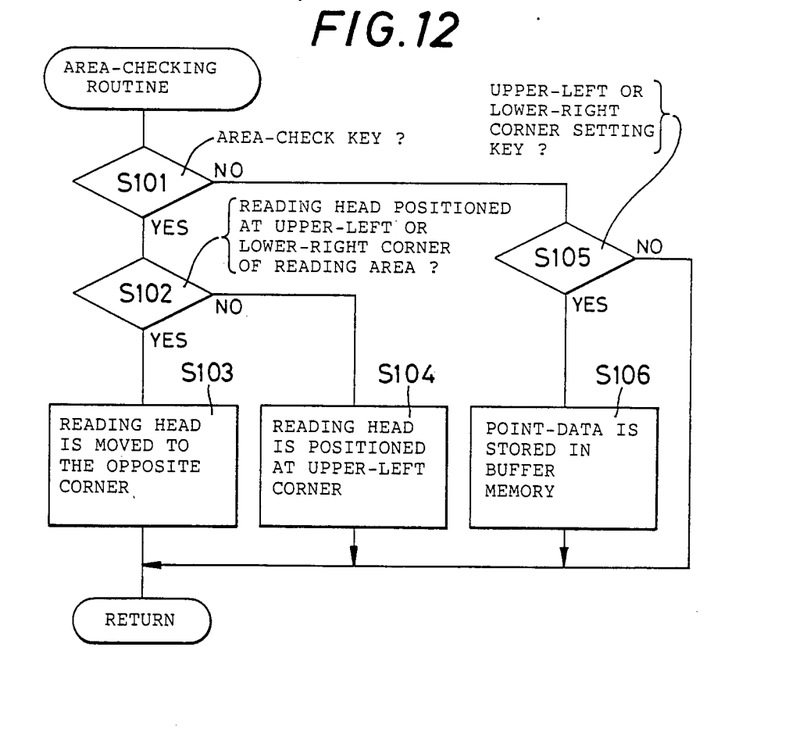
FIG. 12 is a flow chart showing a portion of the control program associated with the modified embodiment of FIG. 11.

Referring next to FIGS. 11 and 12, a modified embodiment of the invention will be described. In this modified embodiment, an area-check key 88 is provided on the reading control panel 80 as shown in FIG. 11. This area-check key 88 serves as an operator-controlled device used for checking for a reading area which has been set by the area-setting means previously discussed, that is, for checking whether the point-data stored in the RAM 104 represents the desired reading area, or not. This checking of the point-data is effected in an area-checking routine of FIG. 12 which may be inserted between steps S8 and S9 of FIG. 8a.

Referring to a flow chart of FIG. 12, an affirmative judgment is obtained in step S101 when the area-check key 88 is activated. Then, the CPU 100 goes to step S102 to check if the reading head 46 (precisely, the marker 72) is positioned at the upper-left or lower-right corner of the reading area. If the judgment in step S102 is affirmative, the CPU 100 goes to step S103 in which the reading head 46 is moved to the opposite corner along the adjacent two sides of the rectangle of the reading area. Described in more detail, if the reading head 46 is positioned at the upper-left corner of the reading area, the paper feeding device 22 and the carriage driving device 40 are operated to first move the marker 72 to the lower-left corner of the rectangle along the left side of the rectangle, and then move the marker 72 to the lower-right corner along the bottom side of the rectangle. If the reading head 46 is positioned at the lower-right corner of the reading area, the marker 72 is first moved to the upper-right corner of the rectangle along the right side of the rectangle, and then to the upper-left corner along the top side of the rectangle. Thus, the marker 72 is moved from the upper-left or lower-right corner to the opposite corner along the two adjacent sides of the rectangle when the area-check key 88 is operated, whereby the operator may check the already set reading area for its location and size.

In the event that the judgment in step S102 is negative, that is, if the reading head 46 (marker 72) is not positioned at the upper-left or lower-right corner of the reading area, the CPU 100 goes to step S104 in which the reading head 46 is moved to the upper-left corner of the rectangle.

If the checking of the already set reading area reveals that the reading area is not proper, the operator may correct the point-data of the reading area by moving the marker 72 (reading head 46) to a suitable position through the appropriate cursor key 82, and activating the upper-left or lower-right corner setting key 84, 86. In this instance, the judgment in step S105 becomes affirmative, and step S105 is followed by step S106 in which the point-data corresponding to the activated setting key 84, 86 is changed and stored in the buffer memory. Thus, the point-data stored in the buffer memory is updated.

In changing the point-data when the already set reading area has been found inadequate, the area-check key 88 may be conveniently used for moving the reading head 46 to a desired position, which is usually close to the upper-left or lower-right corner point. Namely, the reading head 46 is moved to the lower-right or upper-left corner of the already set reading area when the area-check key 88 is operated while the marker 72 is located at the upper-left or lower-right corner, respectively. Alternatively, the reading head 46 not located at the upper-left or lower-right corner will be moved to the upper-left corner by operating the area-check key 88. To change the reading area, therefore, the area-check key 88 is first operated to move the marker 72 to the upper-left or lower-right position, and then the appropriate cursor key 82 is operated to move the marker 72 to a new position near the upper-left or lower-right corner. With the marker 72 located at the desired new position, the appropriate setting key 84, 86 is operated to store the corresponding point-data into the buffer memory. Thus, the point-data may be easily changed for modified.

After the reading area has been checked and its point-data has been changed if necessary, the operator activates the start key 92 to start an operation to read the images within the set reading area. As a result, the judgment, in step S9 of FIG. 8 becomes affirmative, and the CPU 100 executes the subsequent steps as previously discussed.

While the present invention has been described in detail with a certain degree of particularity, for illustrative purpose only, it is to be understood that the invention is not confined to the precise disclosure of the illustrated preferred embodiments, but may be otherwise embodied.

For example, it is not essential to provide the cursor 70 having the marker 72. A marker may be provided at an easy-to-watch position on the reading head 46, or alternatively the reading head 50 of the reading head 46 may function as a marker.

In the illustrated embodiments, the reading head 46 is positioned at the upper-left corner of a new reading area, and the point-data of the lower-right corner of this reading area is determined based on the position of the upper-left corner and on the already stored point-data of the previous reading area which has the same size and shape as the new reading area. However, it is possible to position the reading head 46 at the lower-right corner of the new reading area, and determine the point-data of the upper-left corner based on the point-data of the lower-right corner thereof and on the point-data of the previous reading area. Further, it is possible to adapt the image reader so that these two different procedures may be selectively used, as needed.

It is also possible that the ROM 102 stores standard area data which represent standard reading areas of different sizes and shapes. In this case, reading areas may be set according to a selected one of the standard area data. More specifically, a reading area corresponding to the selected standard area data may be set by positioning the reading head 46 at a specific one of plural points which define the reading area. The other points, such as the opposite corner point in the case of a rectangular reading area, may be automatically obtained according to the standard area data.

In the illustrated embodiments, the upper-left and lower-right corner setting keys 84, 86 serve as the first operator-controlled device for setting the positions of the upper-left and lower-right corners of a reading area, when the keys 84, 86 are operated at different timings, but serve as the second operator-controlled device for setting the position of the lower-right corner of the reading area, when the keys 84, 86 are operated at the same time. In the latter case, the position of the lower-right corner may be set even though the reading head 46 is not positioned at that lower-right corner. However, the second operator-controlled device may be an exclusively designed key, or may be a combination of the upper-left or lower-right corner setting key 84, 86 and another key such as a code key which is operated simultaneously with the corner setting key 84 or 86.

Although the second embodiment of FIGS. 11 and 12 is adapted such that the depression of the area-check key 88 will cause the reading head 46 (marker 72) to be moved relative to the paper along the two adjacent sides of the rectangle of the reading area, it is possible that the relative movement takes place along the entire periphery of the rectangle or along the diagonal of the rectangle. Further, it is possible to establish a reading area which is defined by a circle or other shapes other than a rectangle, which covers the desired images to be read.

In the second embodiment, the reading head 46 is moved to the upper-left corner of the already set reading area when the area-check key 88 is activated while the reading head 46 is not positioned at the upper-left or lower-right corner of the reading area. However, it is possible that the activation of the area-check key 88 with the head 46 not located at the upper-left or lower-right corner position will cause the head 46 to be moved to the nearer one of the these two corner positions. It is further possible that the activation of the area-check key 88 with the head 46 not located at the upper-left or lower-right corner position will have no effect, or will cause the buzzer to be energized to inform the operator of an erroneous operation.

It will be obvious to those skilled in the art that various other changes may be made in connection with the mechanical arrangement of the reading head, paper feeding and carriage driving devices, etc., the control system and the control programs, without departing from the scope and spirit of the invention defined in the appended claims.

What is claimed is:

1. An image reader for reading images on a surface of a medium, comprising:
   a feeding device for feeding the medium in one of opposite directions;
   a carriage movable in a direction perpendicular to the direction of feed of the medium;
   a driving device for moving said carriage;
   a reading head mounted on said carriage for reading the images on the surface of the medium;
   area-setting means for setting a reading area on the surface of the medium within which the images are read by said reading head, said reading area being set while said reading head is moved relative to said medium by said feeding and driving devices; and
   reading control means for controlling said feeding and driving devices and said reading head, to cause said reading head to read the images within said reading area while the reading area is scanned by said reading head,
   said area-setting means comprising memory means for storing point-data representing a plurality of points defining said reading area, a first operator-controlled device operable to set said reading area, first area-setting control means for storing into said memory means the point-data representing each one of said plurality of points, when said reading head is positioned at said each one of the plurality of points one after another by said first operator-controlled device, a second operator-controlled device operable after the point-data representing a specific one of said plurality of points has been determined, and second area-setting control means for determining, upon operation of said second operator-controlled device, the point-data representing the other points of said plurality of points, according to a predetermined relative positional relation between said specific point and said other points, and storing the determined point-data into said memory means.

2. An image reader according to claim 1, wherein said first operator-controlled device comprises a plurality of positioning keys operable to activate said feeding and driving devices for positioning said reading head at one of said plurality of points, and a plurality of point-setting keys operable to activate said first area-setting control means to store the point-data representing said one of the plurality of points.

3. An image reader according to claim 1, wherein said second operator-controlled device is operable to set another reading area on the surface of the medium, after said point-data representing said plural points have been stored in said memory means, said second area-setting control means determining, based on said point-data stored in said memory means, point-data representing points of said another reading area which correspond to said other points of said reading area whose point-data have been stored in said memory means.

4. An image reader according to claim 1, wherein said second area-setting control means determines the point-data representing said other points, according to standard area data which represents a standard reading area, said standard area data defining said predetermined relative positional relation.

5. An image reader for reading images on a surface of a medium, comprising:
a feeding device for feeding the medium in one of opposite directions;
a carriage movable in a direction perpendicular to the direction of feed of the medium, said carriage carrying a cursor member which has a marker;
a driving device for moving said carriage;
a reading head mounted on said carriage, and including a reading portion for reading the images on the surface of the medium, said marker of the cursor member being disposed a predetermined distance away from said reading portion of the reading head along the surface of the medium;
area-setting means for setting a reading area on the surface of the medium within the images are read by said reading head, said area-setting means setting said reading area by positioning said marker relative to said medium by operating said feeding and driving devices; and
reading control means for shifting the reading area set by said area-setting means, by said predetermined distance, said reading control means controlling said feeding and driving devices and said reading head, to cause said reading head to read the images within the shifted reading area while said shifted reading area is scanned by said reading head.

6. An image reader according to claim 5, wherein said cursor member is a planar transparent member of synthetic resin having cross hairs as said marker.

7. An image reader according to claim 5, wherein said area-setting means comprises:
memory means for storing point-data representing a plurality of points defining said reading area;
a plurality of positioning keys operable to activate said feeding and driving devices for positioning said reading head at one of said plurality of points; and
a plurality of point-setting keys operable while said reading head is positioned at said one of the plurality of points, to store into said memory means the point-data representing said one of the plurality of points.

8. An image reader according to claim 5, wherein said area-setting means comprises:
memory means for storing point-data representing a plurality of points defining said reading area;
a first operator-controlled device operable to set said reading area;
first area-setting control means for storing into said memory means the point-data representing each one of said plurality of points, when said reading head is positioned at said each one of the plurality of points one after another by said first operator-controlled device;
a second operator-controlled device operable after the point-data representing specific one of said plurality of points has been determined; and
second area-setting control means for determining, upon operation of said second operator-controlled device, the point-data representing the other points of said plurality of points, according to a predetermined relative positional relation between said specific point and said other points, and storing the determined point-data into said memory means.

9. An image reader for reading images on a surface of a medium comprising:
a feeding device for feeding the medium in one of opposite directions;
a carriage movable in a direction perpendicular to the direction of feed of the medium;
a driving device for moving said carriage;
a reading head mounted on said carriage for reading the images on the surface of the medium;
area-setting means for preparing area data defining a reading area on the surface of the medium within which the images are read by said reading head, said reading area being set while said reading head is moved relative to said medium by said feeding and driving devices;
reading control means for controlling said feeding and driving devices and said reading head, to cause said reading head to read the images within said reading area while the reading area is scanned by said reading head;
an operator-controlled device operable to check for said reading area which has been set by said area-setting means; and
area-checking control means for activating, upon operation of said operator-controlled device, said feeding and driving devices according to said area data, to produce a relative movement between said reading head and said medium, which permits an operator of the image reader to perceive said reading area.

10. An image reader according to claim 9, wherein said reading area is defined by a rectangle, and said relative movement between said reading head and said medium comprises a movement along two adjacent sides of said rectangle.

11. An image reader according to claim 9, wherein said area-setting means comprises:
memory means for storing point-data representing a plurality of points defining said reading area;
a plurality of positioning keys operable to activate said feeding and driving devices for positioning said reading head at one of said plurality of points; and
a plurality of point-setting keys operable while said reading head is positioned at said one of the plurality of points, to store into said memory means the point-data representing said one of the plurality of points.

12. An image reader according to claim 9, wherein said area-setting means comprises:

memory means for storing point-data representing a plurality of points defining said reading area;

a first operator-controlled device operable to set said reading area, first area-setting control means for storing into said memory means the point-data representing each one of said plurality of points, when said reading head is positioned at said each one of the plurality of points one after another by said first operator-controlled device;

a second operator-controlled device operable after the point-data representing a specific one of said plurality of points has been determined; and second area-setting control means for determining, upon operation of said second operator-controlled device, the point-data representing the other points of said plurality of points, according to a predetermined relative positional relation between said specific point and said other points, and storing the determined point-data into said memory means.

13. An image reader according to claim 9, wherein said carriage carries a cursor member having a marker which is disposed a predetermined distance away from a reading portion of said reading head along the surface of the medium, said area-setting means setting said reading area by positioning said marker relative to said medium, said reading control means shifting the reading area set by said area-setting means, by said predetermined distance, and causing said reading head to scan the shifted reading area.

* * * * *